United States Patent [19]

Amin et al.

[11] 4,123,473

[45] Oct. 31, 1978

[54] TRANSPARENT SHEETS AND CONTAINERS FORMED FROM POLYCARBONATE-POLYESTER BLENDS AND FORMATION THEREOF

[75] Inventors: Surendra A. Amin, Pottsville; Phillip S. Bollen, Auburn, both of Pa.; William Sacks, Gillette, N.J.

[73] Assignee: Allied Chemical Corporation, Morristown, N.J.

[21] Appl. No.: 739,214

[22] Filed: Nov. 5, 1976

Related U.S. Application Data

[63] Continuation-in-part of Ser. No. 625,299, Oct. 23, 1975, abandoned.

[51] Int. Cl.$^2$ .............................................. C08L 67/02
[52] U.S. Cl. .................................. 260/860; 264/176 R; 426/108; 426/123
[58] Field of Search ........................................ 260/860

[56] References Cited

U.S. PATENT DOCUMENTS

| | | | |
|---|---|---|---|
| 3,218,372 | 11/1965 | Okamura et al. | 260/860 |
| 3,720,732 | 3/1973 | Sevenich | 260/860 |
| 3,745,150 | 7/1973 | Corsover | 260/75 T |
| 3,956,229 | 5/1976 | Bollen et al. | 260/860 |
| 3,975,355 | 8/1976 | Bollen et al. | 260/860 |

Primary Examiner—Walter C. Danison
Attorney, Agent, or Firm—Henry E. Naylor; Roger H. Criss

[57] ABSTRACT

A sheet formed from a uniform blend of from about 80 to 97% by weight of polyethylene terephthalate having an intrinsic viscosity of above about 0.9 and a melt viscosity at 525° F. of above about 10,000 poises and correspondingly from about 20 to 3% by weight of a polycarbonate resin having an intrinsic viscosity of about 0.4 to 0.6 and a melt viscosity at 500° F. of less than 50,000 poises; said sheet having a haze value as determined by ASTM D-1003 of less than about 2% and being essentially amorphous and non-oriented. Also disclosed is a process for forming a sheet which comprises uniformly blending the composition, extruding the composition into a sheet at a temperature between about 490° to 530° F. and rapidly cooling the sheet by contact with at least one cooling surface maintained at a surface temperature in the range of about 50° to 160° F. for a period of time not exceeding about 15 seconds. Containers may be formed from such sheets by a thermoforming step at temperatures in the range of about 210° to 280° F.

6 Claims, No Drawings

TRANSPARENT SHEETS AND CONTAINERS FORMED FROM POLYCARBONATE-POLYESTER BLENDS AND FORMATION THEREOF

CROSS-REFERENCE TO RELATED APPLICATIONS

This application is a continuation-in-part of copending Ser. No. 625,299, filed Oct. 23, 1975, now abandoned.

BACKGROUND OF THE INVENTION

1. Field of the Invention

This invention relates to transparent sheets formed from blends of polycarbonate and polyethylene terephthalate resins, a process for their production and containers formed therefrom.

2. Discussion of the Prior Art

Polyethylene terephthalate (sometimes referred to as "PET") resins can be employed to prepare transparent film and sheet. Usually the resin is extruded into an amorphous flat sheet, which is then biaxially stretched and thereafter heat set to impart a desired degree of crystallization to the sheet. Such biaxially oriented and crystallized products are strong and clear but cannot readily be formed into containers since the process of biaxially stretching removes most of the extensibility of the sheet. If amorphous PET sheet is produced by rapid cooling of the molten sheet, a clear and transparent product may be obtained which is formable into containers. However, these containers soften at too low a temperature to permit their use in hot-filled food packaging applications where the filling may typically be at a temperature of about 150° to 180° F. or greater which facilitates rapid filling of viscous products as well as destroying bacteria. On the other hand, if PET sheet is produced by slow cooling of the molten resin, the product obtained is partially crystallized, milky and brittle and hence unsuited for container fabrication.

Although it is known that lower intrinsic viscosity PET resins may be modified by the addition of polycarbonates as is described in U.S. Pat. No. 3,218,372 to Okamura et al issued in 1965, in order to increase the hardness, strength and electrical properties of the molding material, such mixtures introduce additional problems. For example, polycarbonate resins employed herein are sensitive to decomposition at extrusion temperatures in the presence of other polymeric materials, such as PET, and tend to form bubbles of gas which are believed to be mainly carbon dioxide. The presence of these bubbles destroy the value of the sheet for thermally formed containers since holes develop and the optical properties are diminished. In addition, no prior process is known to the inventors which permits the extrusion of such blends into highly clear sheets having uniform transparency and low haze. This additional problem evidently arises from the wide dissimilarity of flow characteristics between the two resins of the Okamura et al. patent so that intimate mixing to obtain the very high degree of uniformity needed in transparent sheet is very difficult to achieve and in practice non-uniformities of various types such as localized surface roughness, flow streaks and other defects become readily evident. It would be desirable if such defects of PET and PET-polycarbonate blends were overcome to provide a practical process for extruding high clarity sheets which permits hot-filling to be used when clear containers are made from the sheet.

In our U.S. Pat. No. 3,956,229 (1976) there is described film and sheet formed from blends of 60 to 85 parts of PET having an intrinsic viscosity of at least about 0.90 and 40 to 15 parts of a polycarbonate resin. Such film or sheet, which has a degree of crystallinity in the range of about 20 to 40%, is essentially non-oriented and may be thermoformed into cook-in-trays and like articles. The film or sheet disclosed therein is formed by blending the polymers, extruding the blend at a temperature above about 500° F. onto a moving support and cooling the support to a surface temperature of about 225° to 380° F. Although such film and sheet have requisite strength and toughness to be utilized for cook-in-tray applications, such sheets have a very high degree of haziness and consequently would not be suitable for applications wherein a clear sheet is desired. In U.S. Pat. No. 3,975,355 (1976) of two of the present inventors (Bollen and Amin), there are described film or sheet similar to that of our copending application but which also includes about 5 to 20 parts by weight of a non-acidic silica filler, such as novaculite. However, such film or sheet likewise has a degree of haziness which precludes its utilization in hot-filled applications, wherein a clear and transparent sheet is required.

SUMMARY OF THE INVENTION

In accordance with this invention, there is provided a sheet suitable for use in hot filling of foods and being formed from a uniform blend of from about 80 to 97% by weight of PET having an intrinsic viscosity of above about 0.9 and a melt viscosity at 525° F. of above about 10,000 poises and correspondingly from about 20 to 3% by weight of a polycarbonate resin having an intrinsic viscosity of about 0.4 to 0.6 and melt viscosity at 500° F. of less than 50,000 poises; said sheet having a haze value as determined by ASTM D-1003 of less than about 2% and being essentially amorphous and non-oriented. There is also provided containers which may be thermoformed from such sheet at temperatures in the range of about 210° to 280° F. Further in accordance with this invention, there is provided a process of forming such sheet which comprises uniformly blending a composition of about 80 to 97% PET having an intrinsic viscosity of above about 0.9 and a melt viscosity at 525° F. of above about 10,000 poises with about 20 to 3% by weight of a polycarbonate resin having an intrinsic viscosity of 0.4 to 0.6 and a melt viscosity at 500° F. of less than about 50,000 poises, extruding said blend at a temperature between about 490° to 530° F. whereby a sheet is formed and cooling said sheet by contact with at least one cooling surface maintained at a surface temperature in the range of about 50° to 160° F. for a period of time not exceeding about 15 seconds, whereby an essentially amorphous and non-oriented sheet is obtained.

It has been found that the selection of the PET and polycarbonate resins are critical as is the extrusion temperatures and cooling rate. The PET resins employed herein impart an increased deformation resistance to containers formed from the blended sheet as well as improved uniformity of optical properties. Moreover, in order to avoid formation of gas bubbles due to polymer decomposition, the blend must be extruded at temperatures below about 530° F. and above about 490° F. In addition, the temperatures utilized to form containers from the sheet must be in the range of about 210° to about 280° F.; the lower limit relates to the inability to form containers of precise dimensions while above the upper limit, the containers become excessably hazy and loose transparency.

DESCRIPTION OF THE PREFERRED EMBODIMENT

The polyethylene terephthalate (hereinafter "PET") employed herein is a polymer having an intrinsic viscosity of at least 0.90, the intrinsic viscosity being measured in a mixed solvent of 60 parts by weight phenol and 40 parts by weight tetrachloroethane at 25° C. Preferably, the intrinsic viscosity is in the range of about 0.9 to 1.2, more preferably about 0.9 to 1.0. The PET resin has a melt viscosity measured at 525° F. of above about 10,000 poises, preferably between about 10,000 to 30,000 poises. The polycarbonate resin employed herein may be any polycarbonate, such as the reaction product of phosgene or a carbonic acid diester, such as diphenol carbonate, with bisphenol A, i.e., poly (4, 4'-isopropylidene diphenylene carbonate). The polycarbonate has an intrinsic viscosity in the range of about 0.4 to 0.6 as measured in dioxane solvent at 30° C. Preferably, the polycarbonate has an intrinsic viscosity in the range of about 0.4 to 0.5. The polycarbonate resin has a melt viscosity at 500° F. of less than 50,000 poises and preferably less than about 30,000 poises; most preferably, the polycarbonate has a melt viscosity of about 5,000 to 30,000 poises. The intrinsic viscosity and melt viscosity referred to herein are the viscosities measured before blending the two polymers.

As referred to above, blends of from about 80 to 97% by weight of PET and correspondingly from about 20 to 3% by weight of polycarbonate are employed herein. It has been found that below about 3% by weight polycarbonate, serious distortion of containers thermoformed therefrom is evidenced during hot filling with food whereas above about 20% by weight polycarbonate, the containers are no longer transparent. Preferably, the amount of polycarbonate in the blend ranges from about 5 to 10% by weight. It is preferred to physically blend the two resins in pellet or powder form at about ambient temperatures. Any suitable mixing equipment may be employed which provide a uniform blend, such as drum tumblers, ribbon blenders and the like. It has been found that if the polymers are blended in their melted state as suggested in the aforesaid Okamura et al. patent, degradation of the polycarbonate resin occurs which results in gas bubbles being formed in the sheet. It has also been found desirable to dry the mixture to a moisture level below about 0.02% by weight water since high moisture levels may result in rapid hydrolytic decomposition of both resins. Such decomposition introduces further problems in obtaining uniform mixing of the resins as well as results in the formation of undesirable gas bubbles.

The blended mixture is thereafter extruded into a sheet at temperatures in the range of about 490° to 530° F. As used herein, the term "sheet" is intended to mean thin cast, extruded or otherwise formed products which have a thickness up to about 50 mils or more and preferably about 5 to 25 mils and most preferably about 10 to 20 mils. As such, the term "sheet" includes "films" (i.e., structures having thickness of below 10 mils) and "sheets" (i.e., structures having thickness above 10 mils) as both terms are used in the plastic film industry. The extrusion temperatures refer to temperatures in the extruder die. Any suitable melt extrusion apparatus can be employed to extrude the sheet.

The sheet is extruded through the extruder onto one or more cooling surfaces, preferably rotating or moving support(s), which are cooled to a surface temperature in the range of about 50° to 160° F., and preferably in the range of about 80° to 120° F. The sheet is in contact with the cooling surfaces for a period of time not exceeding about 15 seconds, preferably not exceeding about 10 seconds, in order to cool the sheet into an essentially amorphous structure. The minimum contact time is that sufficient to cool the sheet and may be in the range of about 0.04 seconds and is preferably in the range of about 1 second. The contact time is dependent upon the thickness and width of the sheet, the speed of the sheet and the temperature and size of the cooling surface. For example, using a three 16 inch diameter roll system with an S-wrap (described below), the contact time may be in the range of about 3 to 15 seconds for sheet of 25 mil thickness and 45 inches width and with a sheet speed in the range of about 15 to 75 feet per minute. On the other hand, for sheet of 15 mil thickness (other parameters being the same), the contact time may be in the range of about 1.5 to 7.5 seconds, for example.

Preferably, the sheet is extruded directly into a stack of three chill rolls rotating at substantially the same speed. For example, the blend may be charged to a screw extruder wherein the blend is melted and additional mixing occurs and the sheet exists through a flat die head into the nip formed by a pair of rotating casting or cooling rolls which may be of any conventional type. For instance, chromium plated rolls provided with necessary internal cooling means (water or organic solvent) may be employed. The sheet is carries over a generally S-shape over the bottom of the two rollers that form the nip and thence around a third roller in contact with the second roller. The third roller serves to further cool down the sheet. As is well understood by those skilled in the art, the rate of extrusion, the width of the extruder die orifice and the speed of the casting rolls may be varied widely and determine the thickness of the sheet. Alternatively, the sheet may be cast directly onto a single casting roll provided with cooling means or between the nip of a pair of cooling rolls rotating at substantially the same speed and without utilizing a third roll in contact therewith. In any case, following extrusion, the sheet may be further cooled down prior to collecting the same by passing the sheet over one or more additional rolls in a manner generally employed for extrusion of films and sheets. Such additional rolls may be heated or unheated. However, any such additional rolls move or rotate at substantially at the same linear speed as the casting rolls so that the sheet is not subjected to a drawing or stretching operation which would orient the same. The sheet is collected utilizing conventional apparatus such as a winding roll or the like.

The sheet of this invention is essentially non-oriented, that is, has a machine direction minimum elongation at break of at least about 200%, preferably at least about 300%. The sheet is essentially amorphous, that is, the PET portion of the sheet is essentially non-crystallized and has a degree of crystallinity of less than about 5%. The crystallinity referred to is that obtained by the density method as described in "Engineering Design for Plastic", E. Baer, Reinhold Publishing Company, 1964, pages 98–99. The sheet has a very low haze level (as determined by ASTM D-1003) of less than about 2%, preferably less than about 1% and has excellent uniformity of transparency.

It has been found that the sheet produced in accordance with this invention is eminently suitable for forming high clarity containers useful in hot-filling applications such as packaging of jellies, syrups, sauces and other food products which are heated in the range of about 150° to 180° F. or higher during the filling operation. Such containers evidence little if any distortion during filling and retain their high clarity.

In order to further describe the present invention, the following non-limiting examples are given.

EXAMPLE 1 (COMPARATIVE)

A sheet of 10 mil thickness was prepared from PET resin having an intrinsic viscosity of 0.95 and a melt viscosity of 525° F. of about 13,000 poises. A 3 ½ inch extruder was used with extrusion temperatures maintained in the range of about 495° to 520° F. The molten polymer was passed through a 34 inch wide slit die which was located about 2 inches from the nip formed by a pair of rotating water chilled rolls which were maintained at surface temperatures in the range of 85° to 115° F. The sheet was cast upon such rolls and was then further cooled with a roll held to a surface temperature of 65° F. and thereafter collected on a winding roll. Small cups measuring 1¾ by 1¼ by ½ inches were thermoformed from the PET sheet at temperatures at the range of 240° to 250° F. and thereafter filled with hot jelly which was at a temperature of 175° F. and an aluminum foil cover was adhered to the container. After cooling, the cups were visually examined and found to be unacceptably distorted. That is, there was substantial shrinkage in localized areas of the cup so that the jelly was forced out over the lip of the cup. Similar tests using PET sheets produced from resin of 0.7 intrinsic viscosity (melt viscosity of about 5,000 poises at 525° F.) were also conducted and the extent of the distortion developed after hot filling was even greater than that for the sheet produced from the higher viscosity resin.

EXAMPLE 2

Sheet of about 10 mil thickness was extruded from a blend of 0.95 intrinsic viscosity PET resin and three different types of poly(4,4'-isopropylidene diphenylene carbonate) resins having intrinsic viscosities ranging from 0.45 to 0.57 as shown in Table 1. Blends were produced at polycarbonate percentages of 10% by weight and the two resins were physically mixed in pellet form in a drum tumbler at ambient (i.e., 75° F.) temperature and dried at 250° F. prior to being passed directly into the extruder. A 3½ inch extruder was used with barrel temperatures of 490° to 550° F. and die temperatures of 500° to 540° F. The extruder screw was operated at 32 to 34 rpm and dies of 34 inches and 43 inches in width were used. The die head was located about 2 inches from the nip formed by a pair of chromium plated rolls of 16 inch diameter of a three stack roll which were internally water cooled to surface temperatures of 100° F. The sheet was passed over the second roll and then around a third cooling roll of similar construction which was maintained at the same surface temperature. The contact time of the sheet against the three rolls was about 3.5 seconds for the narrower sheet and about 4.5 seconds for the wider sheet. Table 1 lists the viscosity characteristics of the polycarbonate resins tested.

TABLE 1

| Type | A | B | C |
|---|---|---|---|
| Intrinsic Viscosity | 0.45 | 0.51 | 0.57 |
| Melt Viscosity, Poises at 500° F. | 18,000 | 27,000 | 44,000 |

Under similar mixing conditions in the extruder, type C resin tended to provide sheets having the least uniformity of optical properties. Type B resin was somewhat improved over type C, whereas type A gave exceptionally uniform clarity and transparency. In each case, the sheet was essentially amorphous as indicated by density measurements (a crystallity level of less than about 5%). It was further discovered that unless the extruder temperatures were closely held below about 530° F., the sheet contained bubbles of gas and was unacceptable for thermoforming of containers, regardless of the uniformity of transparency.

EXAMPLE 3

Additional samples of sheet were prepared from several blends of 0.95 I.V. PET, and 5 to 20% of polycarbonate resins (types A and C from Table 1). The sheets (10 mils) were extruded under the conditions of Example 2 and were all essentially amorphous as indicated by density measurements (crystallinity of less than about 5%). Table 2 gives the results of the tests on optical properties and distortion of resistance as measured by a Vicat type test.

TABLE 2

| Sample | 1 | 2 | 3 | 4 | 5 | 6 | 7 |
|---|---|---|---|---|---|---|---|
| Polycarbonate Type | A | A | A | C | C | C | — |
| % Polycarbonate | 5 | 7 | 10 | 10 | 20 | 30 | 0 |
| % Haze | <2 | <2 | <2 | <2 | <2 | >5 | <2 |
| Uniformity of Optical Properties | VG | VG | VG | F | M | M | VG |
| Vicat Distortion, mm at 190° F. | 3.5-4.5 | — | — | 5-5.5 | 2.3-3.5 | — | 5.8-6.0 |

In the above Table, the Vicat test is a distortion test showing the relative softness of the sheet and measures the probe penetration level. A modified Vicat test was performed by mounting a 3×3 inch sample of the sheet in a frame. The sample was immersed in a glycerine bath which was heated at a rate of 2° C per minute. A vertically mounted steel rod free to move in a supporting collar and having a ⅛ inch diameter tip was placed against the sheet, the rod being weighted to a total weight of about 390 grams. As the heating progressed, the depth of penetration of the rod into the sheet was measured using a cathetometer. Under uniformity of optical properties, VG means very good, F means fair and M marginal. This was determined visually using as a comparison standard a sheet extruded from 100% polyester resin which was rated VG (Sample 7).

As can be seen from Table 2, levels of polycarbonate greater than about 20% gave higher haze content, whereas the distortion level was signifanctly diminished at 190° F. when 5 to 20% polycarbonate was present compared to sheet formed from 100% PET and cooled using chilled rollers maintained at 75° to 160° F.

EXAMPLE 4

Sheet of 10 mil thickness containing 5 and 7% polycarbonate resin (Type A of Table 1) was produced under conditions of Example 2. Containers 8×6×1½ inches were formed on a Thermtrol pressure-type thermoforming machine in which the sheet was heated to temperatures in the range of to 210° to 280° F. using the heating of ¼ second, ½ second and 1 second dwell times. With ¼ second heating time, temperatures of at least 270° F. were required with the 5% blend while at longer heating times, temperatures as low as 210° F. could be used to produce highly transparent trays. With the 7% blend at heating times of ½ second to 1 second, containers with best optical properties as judged visually were obtained at 270° to 280° F. No distortion was seen in containers which were heated to 170° to 190° F. in water.

EXAMPLE 5

Containers formed in a manner similar to that of Example 4 from the sheet of Sample 4 of Table 2 were hot filled with jelly which was at a temperature of 175° F. There was no visual distortion or spillover of the jelly after the containers were cooled.

EXAMPLE 6

Samples of amorphous sheet were prepared from PET resins having intrinsic viscosities of about 0.7 and 0.95 (samples 1 & 2) and from mixtures of PET and polycarbonate containing 5%, 7%, 10%, and 20%, by weight (Samples 3,4,5 & 6 respectively). Containers of about 150 ml. in volume were made by thermoforming these samples on a Thermtrol pressure former at temperatures of 195° to 280° F. using a 3 second cycle which included 1 second heating, 1 second cooling and 1 second cutting. The containers were tested for heat resistance by the two following methods.

Method A-Hot Fill Test the containers were filled with hot water at various temperatures allowing 10 minutes after filling before the samples were examined for any evidence of shrinkage or distortion. The water temperature was steadily raised until the temperature at which visible distortion or shrinkage of the container took place was reached. Table 3 lists these maximum temperatures for the various samples.

Method B-Water Inversion Test the thermoformed containers were immersed in water at various temperatures with 10 minute exposure each temperature. The temperature was steadily increased until the maximum temperature at which the container resisted distortion or shrinkage was determined. Table 3 lists the maximum temperatures.

TABLE 3

| Sample No. | Polycarbonate (%) | I.V. of PET Resin | Maximum Temperature °F Method A | Method B |
|---|---|---|---|---|
| 1 | 0 | 0.7 | 145 | 134 |
| 2 | 0 | 0.95 | 151 | 138 |
| 3 | 5 | " | 158 | 145 |
| 4 | 7 | " | 161 | 147 |
| 5 | 10[a] | " | 164 | 151 |
| 6 | 20[b] | " | 164 | 151 |

[a] some haze developed on forming the container
[b] considerable haze developed on forming the container It can be seen that the maximum distortion temperatures for the 5% polycarbonate sample was 7° F higher under both tests than a 100% PET sheet. As the percent polycarbonate increased to 10%, an increase in the distortion temperature occured, although some haze was present in containers thermoformed from such sheet. No increase in maximum distortion temperature was noted with the 20% polycarbonate sample as opposed to the 10% sample. Table 3 also shows that the use of a PET resin having an intrinsic viscosity of 0.95 has improved maximum distortion temperatures over a PET resin having an intrinsic viscosity of 0.7

EXAMPLE 7

Example 2 was followed except that the sheet had a thickness of about 16 mil and contained 3% by weight of a polycarbonate resin having an intrinsic viscosity of 0.49 and a melt viscosity at 500° F. of 18,000 cps. The resins were predried to a moisture content below 0.01%. The extrusion temperature was about 570° F. and an extrusion die of 47 inches in width was used with the die head located about 3 inches from the nip. The third cooling roll was maintained at a surface temperature of about 80° F.

Cheese and cracker containers were thermoformed from the sheet using a commercial double sided contact heating thermoformer at a temperature at 310° F. for about ⅛ second contact time. The containers included two compartments, the cheese compartment measuring 1 inch deep × 1½ inches wide × 1-5/16 inches long and the cracker compartment measuring 1 inch deep × 1-3/8 inches wide × 2¾ inches long. The containers were filled with melted cheese at 163° F. and crackers and a 2 mil thick overlayer of a biaxially oriented PET sheet provided with a heat seal layer was placed on top of the containers.

No distortion of the containers was observed. In comparison, in similar containers which were made from a sheet containing 100% of the PET, unacceptable distortion at the corners of the containers was observed after filling.

It will be understood that variations and modifications of the present invention may be made without departing from the scope of the invention. It is also to be understood that invention is not to interpreted as limited to the specific embodiment disclosed herein, but only in accordance with the appended claims when read in light of the foregoing disclosure.

We claim:

1. A sheet suitable for use in hot filling of foods and being formed from a uniform blend of from about 80 to 97% by weight of polyethylene terephthalate having an intrinsic viscosity of about 0.9 as measured in a mixed solvent of 60 parts by weight phenol and 40 parts by weight tetrachloroethane at 25° C, and a melt viscosity at 525° F of above about 10,000 poises and correspondingly from about 20 to 3% by weight of a polycarbonate resin having an intrinsic viscosity of about 0.4 to 0.6, as measure in dioxane at 30° C, and a melt viscosity of 500° F. of less than 50,000 poises said sheet being non-oriented having a haze value as determined by ASTM D-1003 of less than about 2% wherein the polyethylene terephthalate portion of the sheet has a degree of crystallinity of less than 5%.

2. The sheet of claim 1 being formed from a blend comprising about 90 to 95% by weight polyethylene terephthalate and correspondingly about 10 to 5% by weight polycarbonate.

3. The sheet of claim 2 wherein said polycarbonate is poly(4,4'-isopropylidene diphenylene carbonate).

4. The sheet of claim 1 wherein said polyethylene terephthalate has an intrinsic viscosity of about 0.9 to 1.2 and a melt viscosity at 525° F. of about 10,000 to 50,000 poises.

5. The sheet of claim 1 wherein said polycarbonate has an intrinsic viscosity of about 0.4 to 0.5 and a melt viscosity at 500° F. of less than about 30,000 poises.

6. A container thermoformed from the sheet of claim 1.

* * * * *

UNITED STATES PATENT OFFICE
CERTIFICATE OF CORRECTION

Patent No. 4,123,473    Dated October 31, 1978

Inventor(s) S. A. Amin, P. S. Bollen, and W. Sacks

It is certified that error appears in the above-identified patent and that said Letters Patent are hereby corrected as shown below:

Claim 1, line 4, after "of" insert -- above -- .

Signed and Sealed this

Fourth Day of September 1979

[SEAL]

Attest:

Attesting Officer

LUTRELLE F. PARKER
*Acting Commissioner of Patents and Trademarks*